US011319851B2

(12) United States Patent
Tomita et al.

(10) Patent No.: US 11,319,851 B2
(45) Date of Patent: May 3, 2022

(54) EXHAUST GAS TREATMENT SYSTEM TO BE FITTED ON A CHASSIS OF AN AUTOMOTIVE VEHICLE

(71) Applicant: VOLVO TRUCK CORPORATION, Gothenburg (SE)

(72) Inventors: Yasuyoshi Tomita, Hongo-chou Kita-ku Saitama (JP); Ayman Mokdad, Grigny (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 189 days.

(21) Appl. No.: 15/100,321

(22) PCT Filed: Dec. 19, 2013

(86) PCT No.: PCT/IB2013/003141
§ 371 (c)(1),
(2) Date: May 30, 2016

(87) PCT Pub. No.: WO2015/092469
PCT Pub. Date: Jun. 25, 2015

(65) Prior Publication Data
US 2016/0298516 A1    Oct. 13, 2016

(51) Int. Cl.
*F01N 3/02*         (2006.01)
*F01N 5/02*         (2006.01)
(Continued)

(52) U.S. Cl.
CPC ............ *F01N 3/2066* (2013.01); *B60K 13/04* (2013.01); *F01N 3/021* (2013.01); *F01N 5/02* (2013.01);
(Continued)

(58) Field of Classification Search
CPC ........ F01N 3/20; F01N 3/0807; F01N 3/0814; F01N 3/0821; F01N 3/2066; F01N 3/21;
(Continued)

(56) References Cited

U.S. PATENT DOCUMENTS 6,266,955 B1 *   7/2001   Liang .................... F01N 3/2066
                                                          60/274
6,301,879 B1 *  10/2001   Weisweiler ........... F01N 3/2066
                                                          60/274
(Continued)

FOREIGN PATENT DOCUMENTS

CN           101680333 A       3/2010
DE           3618514 A1       12/1987
(Continued)

OTHER PUBLICATIONS

Translation of description of DE 4200514 A1 provided by EPO website and printed on May 8, 2018 (Year: 1993).*
(Continued)

*Primary Examiner* — John D Walters
(74) *Attorney, Agent, or Firm* — Venable LLP; Jeffri A. Kaminski

(57) ABSTRACT

An exhaust gas treatment system to be fitted on a chassis of an automotive vehicle. The system includes a selective catalytic reduction device and a gaseous fluid supplying device. The gaseous fluid supplying device includes a tank containing a material which is capable of retaining gaseous fluid by absorption and/or adsorption and/or formation of chemical complexes, and of releasing previously retained gaseous fluid. The gaseous fluid supplying device further includes a gaseous fluid delivery system capable of causing the release of gaseous fluid by the material and an injection system for injecting gaseous fluid upstream from the selective catalytic reduction device. Additionally the system may include a particulate filtering device. The particulate filtering (Continued)

device, the selective catalytic reduction device and the gaseous fluid supplying device are arranged within a same frame which includes fastening means for fastening the frame to the vehicle chassis.

21 Claims, 3 Drawing Sheets

(51) Int. Cl.
  *F01N 3/20* (2006.01)
  *F01N 3/021* (2006.01)
  *F01N 13/00* (2010.01)
  *F01N 13/18* (2010.01)
  *B60K 13/04* (2006.01)

(52) U.S. Cl.
  CPC ....... *F01N 13/009* (2014.06); *F01N 13/0097* (2014.06); *F01N 13/011* (2014.06); *F01N 13/1805* (2013.01); *F01N 2610/02* (2013.01); *F01N 2610/06* (2013.01); *F01N 2610/10* (2013.01); *F01N 2610/11* (2013.01); *F01N 2610/1406* (2013.01); *Y02A 50/20* (2018.01); *Y02T 10/12* (2013.01)

(58) Field of Classification Search
  CPC .. F01N 13/009; F01N 13/0097; F01N 13/011; F01N 13/1805; F01N 5/02; F01N 2610/02; F01N 2610/06; F01N 2610/10; F01N 2610/11; F01N 2610/1406; F01N 3/021; F01N 13/04; B60K 13/00; B60K 13/04
  USPC ........................................................ 180/309
  See application file for complete search history.

(56) References Cited

U.S. PATENT DOCUMENTS

| | | | | |
|---|---|---|---|---|
| 6,622,668 | B2* | 9/2003 | Izumi | E02F 9/00 123/41.49 |
| 6,908,499 | B2* | 6/2005 | Lin | C23C 16/4412 55/392.1 |
| 7,293,408 | B2* | 11/2007 | Kohler | B01D 53/9431 180/225 |
| 7,923,407 | B2* | 4/2011 | Goto | B01D 53/945 502/327 |
| 8,141,199 | B1* | 3/2012 | Garland | A47L 11/4083 15/320 |
| 8,167,067 | B2* | 5/2012 | Peterson | F01N 3/055 180/68.2 |
| 8,230,678 | B2* | 7/2012 | Aneja | F01N 3/2066 60/295 |
| 8,276,370 | B2* | 10/2012 | Kamiya | B01D 53/9409 60/286 |
| 8,549,849 | B2* | 10/2013 | Griffin | C01C 1/006 60/303 |
| 8,893,484 | B2* | 11/2014 | Park | F01N 5/02 60/274 |
| 8,950,173 | B2* | 2/2015 | Patade | F01N 3/021 60/286 |
| 8,997,464 | B2* | 4/2015 | Santoso | F01N 5/02 60/288 |
| 9,027,688 | B2* | 5/2015 | Okuda | B60K 13/04 180/89.2 |
| 9,187,877 | B2* | 11/2015 | Imano | E02F 9/0866 |
| 9,217,236 | B2* | 12/2015 | Yamashita | F01N 3/2066 |
| 9,309,643 | B2* | 4/2016 | Yamagoe | E02F 9/0866 |
| 9,381,466 | B2* | 7/2016 | Kim | B01D 53/90 |
| 9,382,690 | B2* | 7/2016 | Okuda | B60K 13/04 |
| 9,476,337 | B2* | 10/2016 | Kobayashi | F01N 3/10 |
| 9,488,368 | B2* | 11/2016 | Schlenke | F22B 1/1807 |
| 9,528,244 | B2* | 12/2016 | Yabe | B60K 11/04 |
| 9,556,770 | B2* | 1/2017 | Sandou | F01N 3/2066 |
| 9,816,758 | B2* | 11/2017 | Gismervik | F28D 1/0213 |
| 9,863,725 | B1* | 1/2018 | Dudis | F28D 20/003 |
| 2001/0053342 | A1 | 12/2001 | Marko et al. | |
| 2004/0069224 | A1* | 4/2004 | Lin | C23C 16/4412 118/715 |
| 2005/0133202 | A1* | 6/2005 | Jorgensen | F28F 27/02 165/103 |
| 2007/0079599 | A1* | 4/2007 | Osaku | F01N 3/2066 60/283 |
| 2008/0314033 | A1 | 12/2008 | Aneja et al. | |
| 2010/0031644 | A1* | 2/2010 | Keane | B60K 13/04 60/295 |
| 2010/0186381 | A1* | 7/2010 | Charles | F01N 3/025 60/282 |
| 2011/0083606 | A1* | 4/2011 | Rudhard | C23C 16/345 118/715 |
| 2013/0014496 | A1* | 1/2013 | Fogg | F01N 3/2066 60/320 |
| 2015/0135686 | A1* | 5/2015 | Hasegawa | F01N 3/0231 60/297 |
| 2015/0275476 | A1* | 10/2015 | Sakai | E02F 3/7631 172/701.1 |
| 2016/0053645 | A1* | 2/2016 | Sandou | F01N 3/2066 60/301 |
| 2016/0115847 | A1* | 4/2016 | Chapman | F01N 3/2892 60/324 |

FOREIGN PATENT DOCUMENTS

| | | |
|---|---|---|
| DE | 4200514 A1 | 7/1993 |
| DE | 102004055570 A1 | 5/2006 |
| DE | 102007058768 A1 | 6/2009 |
| DE | 102009058300 A1 | 6/2010 |
| DE | 102011056658 A1 | 2/2013 |
| JP | 2001500063 | 1/2001 |
| JP | 2006530446 | 8/2006 |
| JP | 2007040224 | 2/2007 |
| WO | 2006087541 A1 | 8/2006 |
| WO | 2013160712 A1 | 10/2013 |

OTHER PUBLICATIONS

International Search Report (dated Jun. 11, 2014) for corresponding International App. PCT/IB2013/003141.
Japanese Official Action (translation) (dated Jun. 1, 2017) for corresponding Japanese App. 2016-540974.
Chinese Official Action (dated Nov. 24, 2017) for corresponding Chinese App. 201380081731.7.

* cited by examiner

EXHAUST GAS TREATMENT SYSTEM TO BE FITTED ON A CHASSIS OF AN AUTOMOTIVE VEHICLE

BACKGROUND AND SUMMARY

The invention relates to an exhaust gas treatment system to be fitted on a chassis of an automotive vehicle, for treating exhaust gases flowing in an exhaust line of an engine of the vehicle.

The invention can be applied in all types of automotive vehicles, especially in heavy-duty automotive vehicles, such as trucks, buses and construction equipment.

Exhaust gases formed due to the combustion of fuel in an internal combustion engine may contain a proportion of undesirable components. To reduce air pollution, vehicles are therefore equipped with various treatment devices that deal with undesirable substances in exhaust gases.

One known example of an exhaust gas treatment system, which has been implemented on various engine arrangements for several years, includes a selective catalytic reduction (SCR) device, designed to treat nitrogen oxides (NOx). In such a device, exhaust gases, mixed with ammonia as a reducer, are treated in a specific catalytic converter where nitrogen oxides are converted essentially into water and nitrogen which are both non-toxic substances.

In many known systems, ammonia is produced on board the vehicle by the decomposition of an urea aqueous solution. The urea solution is stored in a reservoir fitted directly on the chassis of vehicle. It is pumped by an injection system to be sprayed in an exhaust pipe where urea is first vaporized and then decomposed into ammonia and other substances.

In known systems, the selective catalytic reduction device, as well as, possibly, the injection system, are included in a same housing which is fastened to the vehicle chassis, this housing being generally called a "muffler". Such housing is fastened to the independently of the urea reservoir. In many cases, the same housing may also contain a particulate filtering device, for example a diesel particulate filter, which removes un-burnt particulates contained in the exhaust gases.

According to an arrangement of the prior art, instead of using an aqueous solution of urea as a precursor of ammonia, there can be provided one or several tanks containing a solid on which ammonia has been previously absorbed or adsorbed. In use, ammonia can be released above a threshold temperature, and directed towards the exhaust line in which it is injected, by an injector, upstream from the catalytic converter. This implementation is advantageous in that it avoids crystallization that occurs when injecting liquid urea solution as a precursor of ammonia, and therefore provides good performance at relatively low temperatures. Also, such systems require less volume that conventional urea aqueous solution reservoirs. An example of such system is for example described in WO2013/160712.

In view of the growing complexity of the exhaust gas treatment systems, their mounting on the vehicle at the time of assembly can be a complex task, involving many different operations on the vehicle assembly line. There is thus a need to develop new exhaust gas treatment systems which are both efficient and easy to install on a vehicle.

It therefore appears that, from several standpoints, there is room for improvement in exhaust gas treatment systems.

It is desirable to provide an exhaust gas treatment system for treating exhaust gases flowing in an exhaust line of an engine of an automotive vehicle, which system is easier to install on a vehicle than the systems of the prior art.

According to a first aspect of the invention, an exhaust gas treatment system to be fitted on a chassis of an automotive vehicle is provided, wherein the system comprises:
a selective catalytic reduction device;
a gaseous fluid supplying device, comprising:
a tank containing a material which is capable of retaining gaseous fluid by absorption and/or adsorption and/or formation of chemical complexes and of releasing previously retained gaseous fluid;
a gaseous fluid delivery system capable of causing the release of gaseous fluid by the material;
an injection system for injecting gaseous fluid upstream from the selective catalytic reduction device;
characterized in that selective catalytic reduction device and the gaseous fluid supplying device are arranged on a same frame which is to be fastened to the vehicle chassis.

The frame may comprise fastening means for fastening the frame to the vehicle chassis.

The treatment of gases may comprise the modification of the chemical composition of the flow of exhaust gases, for example through the removal of some substances and/or through the chemical transformation of at least one chemical specie into at least another chemical specie.

In concrete terms, according to the invention, the selective catalytic reduction (SCR) device, as weir as the gaseous fluid supplying device—and in particular the tank containing the material capable of releasing fluid—are not directly secured to the vehicle chassis, but arranged and secured on a frame, acting as a supporting structure, which is itself secured on the vehicle chassis. In other words, the element which is directly secured to the vehicle chassis is the frame, not each of the above mentioned devices.

Owing to this feature, the exhaust gas treatment system has the advantage of an optimised packaging, leading to a better assembly process and ultimately to significant quality and cost improvements.

The improved compactness can result from the integration of several components in a same volume, leading to a reduction in pipe lengths required between said components, from the uselessness of providing dedicated fastening means for fastening each component on the vehicle chassis, and/or from a better spatial arrangement of the components in order to optimise their positions in relation to one another.

Therefore, even if the frame according to the invention can be larger than a conventional muffler, its size is however reduced as compared to the overall size of an assembly of a muffler and a gaseous fluid supplying device of the prior art.

Moreover, having an integrated system makes its installation and maintenance much easier, in particular since there can be less connections to make: as connections between the devices integrated in the frame can be pre-arranged, there is only a need to connect the system to the appropriate elements of the vehicle. The exhaust gas treatment system may thus be pre-assembled on the frame, and the frame, with the already mounted exhaust gas treatment devices, can be mounted on the vehicle chassis on the vehicle assembly line. This reduces the time needed for mounting the exhaust gas treatment system on the vehicle on the vehicle assembly line. The exhaust gas treatment system may thus be pre-assembled on the frame at a separate location, for example on the side of the vehicle assembly line or even at a totally remote location such as at a supplier's plant. At such pre-assembly location, the exhaust gas treatment system may be tested prior to its mounting on the vehicle, for example for fluid tightness.

The invention is of special interest with a gaseous fluid supplying device using a material capable of retaining and releasing gaseous fluid, for example ammonia, as compared to alternative devices in which the source of fluid can be, for example, an aqueous solution of said fluid or pressurized gaseous fluid. Indeed, the overall gaseous fluid supplying device is more compact than these alternative devices, because the corresponding tank can have a much smaller size and weight for a same capacity of fluid release, and because the device does not require pressure regulating means. Additionally, as the product injected in the exhaust line is gaseous fluid, there is no need to provide for a large and sophisticated device conventionally used for ensuring a satisfactory mixing between exhaust gases and liquid urea solution.

According to an embodiment, the gaseous fluid supplying device may comprise:
  a tank containing a material which, depending on the temperature, is capable of retaining gaseous fluid and of releasing previously retained gaseous fluid;
  a heating system capable of increasing the tank temperature to allow the release of gaseous fluid.

According to one embodiment, the exhaust gas treatment system comprises a heating system which derives heat from the heat of exhaust gases flowing from the engine. By the provision of an integrated exhaust gas treatment system, as previously explained, a further significant advantage is that it is much easier to use the heat of exhaust gases to allow fluid to be released from the material contained in the tank. Indeed, insofar as the tank is installed close to the hot source leading to fluid release, this avoids the implementation of long pipes which may further require thermal insulating.

In other words, a further advantage of an integrated system according to the invention is that it greatly improves the thermal exchanges required for fluid release, and therefore the exhaust gas treatment system overall efficiency.

The exhaust gas treatment system may further comprise a heating line which branches from the exhaust line, and which may return to said exhaust line or which may end directly to the atmosphere, said heating line carrying exhaust gases and having a portion which is thermally connected to the tank and forms a heat exchanger.

The exhaust gas treatment system may further comprise a control unit for controlling the flow of exhaust gases in the heating line, for example through a valve arranged in the heating line. Such valve can be a part of the heating system arranged on the frame.

Controlling the valve makes it possible to control the flow of exhaust gases in the heating line, and therefore the amount of heat transferred to the tank. Consequently, the temperature in the tank can be controlled, resulting in fluid being released or not. By controlling the tank temperature, it may be possible either to control whether fluid release occurs or not, in an on/off manner, or possibly to control the rate of fluid release in a proportional manner.

According to one embodiment, the heating line is also arranged on the frame. Owing to this feature, the length of pipes required to connect the various devices may be further reduced, thereby improving the system compactness. Moreover, the efficiency of thermal exchanges is further improved, and the thermal insulating of said pipes can be unnecessary.

According to one embodiment, the heating system can comprise a heat exchanger which is operated both by the heat of exhaust gases flowing from the engine and by a cooling fluid, the exhaust gas treatment system further comprising a control unit for controlling the flow of exhaust gases and the flow of cooling fluid in the heat exchanger, for example by means of at least one valve, thereby controlling the tank temperature.

This disposition is advantageous in that it ensures a better tank temperature control, thanks to the use of a hot source and a cooler source, the respective flows of which can be controlled. In particular, the cooling fluid makes it possible to decrease the heat transferred to the tank—i.e. to the material contained in said tank—in case, in some operating conditions, the exhaust gases temperature is too high. Indeed, such a too high temperature could lead to a deterioration of the material retaining fluid and/or to improper operation of the gaseous fluid supplying device, for example causing an unwanted fluid release.

It has to be noted that this disposition according to which the heating system uses both the exhaust gases and a cooling fluid to control the tank temperature can also be implemented in a non-integrated exhaust gas treatment system, i.e. such a system in which the particulate filtering device, the SCR device, and the gaseous fluid supplying device are not all arranged within a same frame.

In a further embodiment of the invention, the system may further comprise at least one of a particulate filtering device or of an oxidizing catalyst device, said device being also arranged within said frame. This further reinforces the compactness and ease of installation of the system.

In a further embodiment of the invention, all the devices of the exhaust gas treatment system, i.e. all the components which participate in the treatment of exhaust gas, are arranged on said frame.

According to a second aspect of the invention, an engine arrangement is provided comprising a combustion engine and an exhaust line carrying exhaust gases flowing from the engine towards the atmosphere, characterized in that it further comprises an exhaust gas treatment system having any one of the features above, which is arranged in the exhaust line.

According to a third aspect of the invention, an automotive vehicle comprising a chassis and an engine arrangement according to the above is provided, wherein the frame is fastened to the vehicle chassis.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
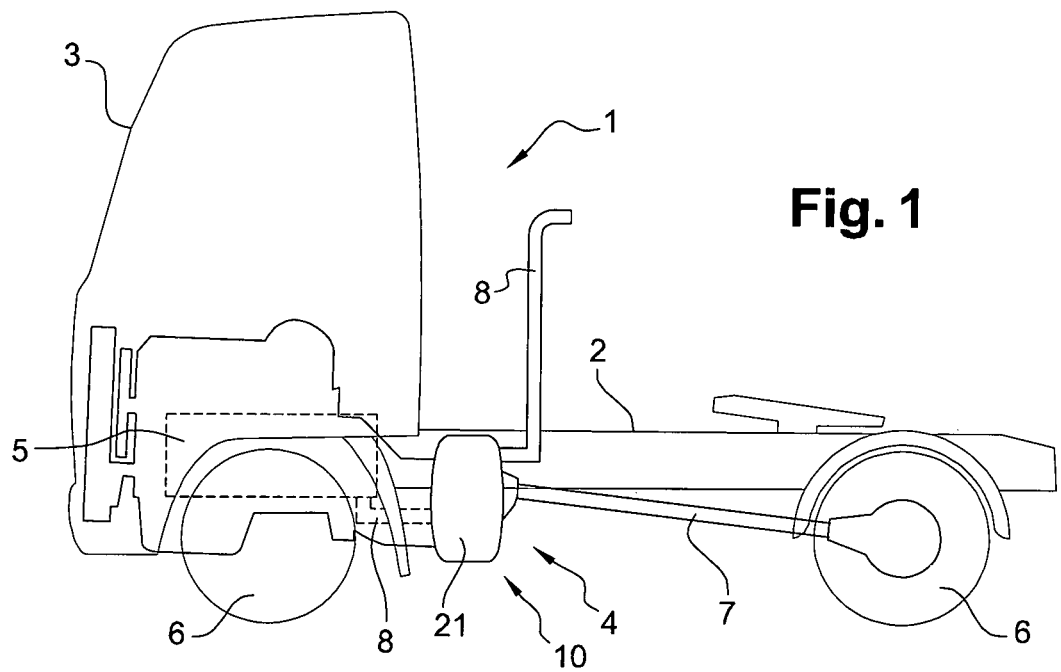
FIG. 1 is a side view of a vehicle provided with an exhaust gas treatment system according to an embodiment of the invention.

FIG. 1 shows a vehicle 1 comprising a chassis 2 and a driver's cab 3 mounted on the chassis. Although the vehicle shown in FIG. 1 is a heavy duty truck, more precisely a tractor truck for pulling a semi-trailer, the invention can be applied to other automotive vehicles, including construction equipment machines.

The vehicle 1 comprises an engine arrangement 4 including a combustion engine 5 which may be located underneath the driver's cab 3 and acts on the drive wheels 6 of the vehicle 1 by way of a drive train 7. More particularly, the engine 5 can be an internal combustion engine, and may be a Diesel engine. The engine arrangement 4 further comprises an exhaust line 8 carrying exhaust gases flowing from the engine 5 towards the atmosphere, as well as an exhaust gas treatment system 10 arranged in the exhaust line 8 and fitted on the vehicle chassis 2.

Figure 2:
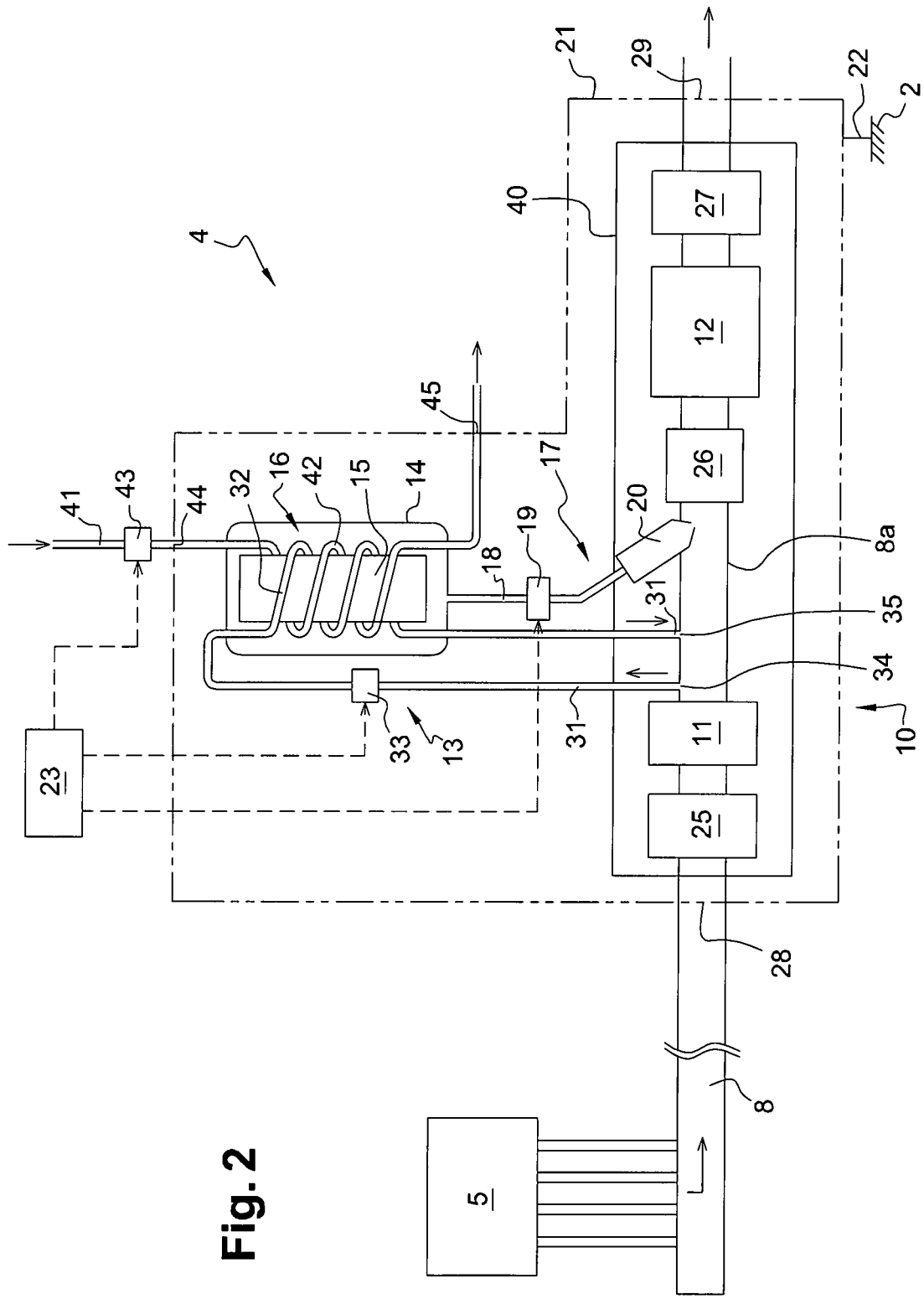
FIG. 2 is a schematic representation of an exhaust gas treatment system according to an embodiment of the invention.

The engine arrangement 4 and the exhaust gas treatment system 10 are schematically illustrated in FIG. 2. In the specification, for simplicity purposes, the term "system" when used alone refers to the exhaust gas treatment system.

The exhaust gas treatment system 10 comprises several devices intended to treat the exhaust gases flowing in the exhaust line 8 before they are released in the atmosphere, especially in view that the so treated gases meet the applicable regulations. In particular, the devices of the exhaust gas treatment system comprise the components which participate in the treatment of exhaust gas, in the meaning that they contribute to the modification of the chemical composition of the flow of exhaust gases, for example through the removal of some substances or through the chemical transformation of at least one chemical specie into at least another chemical specie.

As shown in FIG. 2, the system 10 may comprise a particulate filtering device 11, hereinafter referred to as filter 11, for retaining the particulate matter contained in exhaust gases and preventing them from being released to the atmosphere.

The system 10 comprises a selective catalytic reduction (SCR) device 12 which comprises a catalytic converter in which at least part of the NOx can be converted essentially into water and nitrogen by means of reaction with a gaseous fluid, for example ammonia, used as a reductant. To that end, the system 10 further comprises a gaseous fluid supplying device 13, which, in this exemplary embodiment, will be a gaseous ammonia supplying device. However, the invention could be implemented with supplying devices storing and releasing other gaseous fluid which could be used in an exhaust gas treatment system for treating the exhaust gases of a combustion engine, such as a gaseous hydrocarbon fluid.

The gaseous ammonia supplying device 13 comprises a tank 14 containing a material 15 which, depending on the temperature, is capable of retaining gaseous ammonia and of releasing previously retained gaseous ammonia. For example, ammonia is released from the material above a threshold temperature. According to an embodiment, the material 15 contained in the tank 14 is capable of retaining gaseous ammonia by absorption and/or adsorption and/or formation of chemical complexes. For example, said material 15 can comprise a saturated inorganic salt such as SrC—More generally, such material 15 can comprise a metal ammine salt described by the generic the formula $Ma(NH_3)nXz$, in which M would be one or more cations selected amongst alkali metals, including Li, Ma, K or Cs, alkaline earth metals including Mg, Ca, Sr or Ba, and/or transition metals including V, Cr, Mn, Fe, Co, Ni, Cu, or Zn or combinations thereof, such as NaAl, KAl, K2Zn, CsCu, or K2Fe. In the formula, X can be one or more anions selected from fluoride, chloride, bromide, iodide, nitrate, thiocyanate, sulphate, molybdate, and phosphate ions while "a" is the number of cations per salt molecule, "z" is the number of anions per salt molecule, and V is the coordination number of 2 to 12, for example 6 to 8. These materials when containing ammonia are capable of desorbing ammonia when they are heated and/or exposed to a vacuum and/or exposed to another releasing mechanism. The material 15 can typically be provided in the form of a block on which gaseous ammonia has previously been retained—for example adsorbed—in a non pressurized state. Said block of material 15 or said tank 14 therefore forms a cartridge which has to be replaced when substantially no ammonia remains retained on the material. In this document, ammonia always refers to gaseous ammonia, even when retained on the material, for example by adsorption. The tank may include an envelope containing the material. This envelope can be rigid or flexible.

The gaseous ammonia supplying device 13 further comprises a gaseous fluid delivery system capable of causing the release of gaseous fluid by the material 15.

In the described example, the releasing mechanism is based on temperature. Therefore, the gaseous fluid delivery system 16 capable of causing the release of gaseous fluid by the material 15 comprises a heating system. The heating system is capable of increasing the tank temperature or at least of the material 15 contained therein, for example above a threshold temperature, to allow the release of gaseous ammonia.

The gaseous ammonia supplying deice 13 further comprises an injection system 17 for injecting gaseous ammonia released from the material 15 contained in the tank 14 upstream from the SCR device 12, into the flow of exhaust gases. To that end, the injection system 17 may comprise (i) an injection line 8 which comes from the tank 14 and which includes a gaseous ammonia dosing device 19 and (ii) an injector 20 typically provided at an outlet of the injection line 18.

The dosing device 19 makes it possible to control the quantity of gaseous ammonia to be injected by the injector 20 and mixed with the exhaust gases upstream from the SCR device 12. The dosing device 19 may comprise a controlled valve capable of directing all or part of the gaseous ammonia flow towards the injector 20, or to block said gaseous ammonia flow. The dosing device 19 may be controlled by a control unit 23 of the exhaust gas treatment system 10.

As schematically illustrated in FIG. 2 in chain-dotted line, the SCR device 12 and the gaseous ammonia supplying device 13 are arranged on a same frame 21. The frame forms a support structure for those devices.

Moreover, said frame 21 may be provided with fastening means 22, so that it can be fastened to the vehicle chassis 2, as also shown in FIG. 1. The fastening means can comprise mechanical fasteners such as bolts, screws, braces, clamps or rivets. Alternatively, the frame 21 can be welded or glued onto the chassis 2. Preferably, the frame 21 is capable of being removably installed on the chassis 2. In other words, instead of being installed independently of each other on the chassis 2, said devices can be mounted on one single frame 21 forming a kind of housing. Thus, these devices are not installed directly on the chassis 2 but on the frame 21, said frame 21 being itself installed on the chassis 2. For example, as shown in FIG. 1, the frame 21 can be mounted on a lateral beam of the chassis 2, for example behind the front wheels 6.

The frame may be adapted to be fastened directly to the chassis, such as directly to a lateral beam of the chassis. However, the frame may also be adapted to be fastened indirectly to the chassis, via an intermediate part or arrangement, such as a console, brackets or any other vehicle part which is itself fastened directly or indirectly to the vehicle chassis. Of course, in the case of a heavy duty-truck as shown on FIG. 1, which has a chassis comprising two longitudinally extending lateral beams connected by transverse cross-members, mounting of the frame on the external side of one the chassis lateral beams, directly or via suitable brackets, is very convenient and can be performed in a way similar to the current known techniques for fastening existing mufflers on such a chassis.

In the embodiment illustrated as a non limitative example, the SCR device 12 is arranged downstream from the filter 11 in the flow direction of exhaust gases from the engine 5 towards the atmosphere, and the injector 20 is located between the filter 11 and the SCR device 12. However, other embodiments could be envisaged.

Furthermore, the system 10 may comprise one or several of the following devices:
- an oxidizing catalyst device 25, such as a Diesel Oxidation Catalyst, which may be located upstream from the filter 11. Such an oxidizing catalyst device 25 can be used to convert NO, CO and HC into NO2, CO2 and CO2+H2O, respectively, by means of 02;—a mixing chamber 26, which may be located downstream from the injector 20 and upstream from, the SCR device 12, for mixing the exhaust gases and the gaseous ammonia before they enter the SCR device 12;
- an additional oxidizing catalyst device 27, such as an Ammonia Slip Catalyst, which may be located downstream from the SCR device 12, for control inn a possible ammonia slip.

According to an embodiment of the invention, at least one of said oxidizing catalyst device 25, of said mixing chamber 26 and/or of said additional oxidizing catalyst 27, and for example all three components, is/are arranged on said frame 21 together with the SCR device 12 and the gaseous ammonia supplying device 13.

The control unit 23, preferably an electronic control unit, can be a control unit dedicated to the exhaust gas treatment system, and it can therefore be also mounted on the same frame 21, or it can an control unit provided on the vehicle 1, in which case it can be provided for controlling also the operation of various components other than those of the exhaust gas treatment system.

In an embodiment of the invention, all the devices of the exhaust gas treatment system, i.e. all the components which participate in the treatment of exhaust gas, in the meaning that they contribute to the modification of the chemical composition of the flow of exhaust gases, for example through the removal of some substances or through the chemical transformation of at least one chemical specie into at least another chemical specie, are arranged on said frame.

Said frame 21 is preferably a physical structure rigid enough to hold the SCR device 12 and the gaseous ammonia supplying device 13. The frame 21 may be a separate physical entity from the SCR device 12 and the gaseous ammonia supplying device 13. However, the frame could be a portion of one of the devices constituting the exhaust gas treatment system, for example integrated with a casing of one or several of the above devices, including the SCR device 12, the gaseous ammonia supplying device 13, the oxidizing catalyst device 25, the filter 11, the mixing chamber 26 and/or the additional oxidizing catalyst device 27.

In practice, the frame 21 can comprise a structure of beams forming a kind of framework and supporting the various devices arranged thereon. Said framework can be fully opened, i.e. the frame 21 being devoid of walls closing the side faces, or partially closed by means of walls closing some of the side faces. Then, pipes 8*a* may be provided to carry the exhaust gases from one device to the subsequent one, as schematically illustrated in FIG. 2, these pipes 8*a* forming part of the exhaust line 8.

Figure 3:
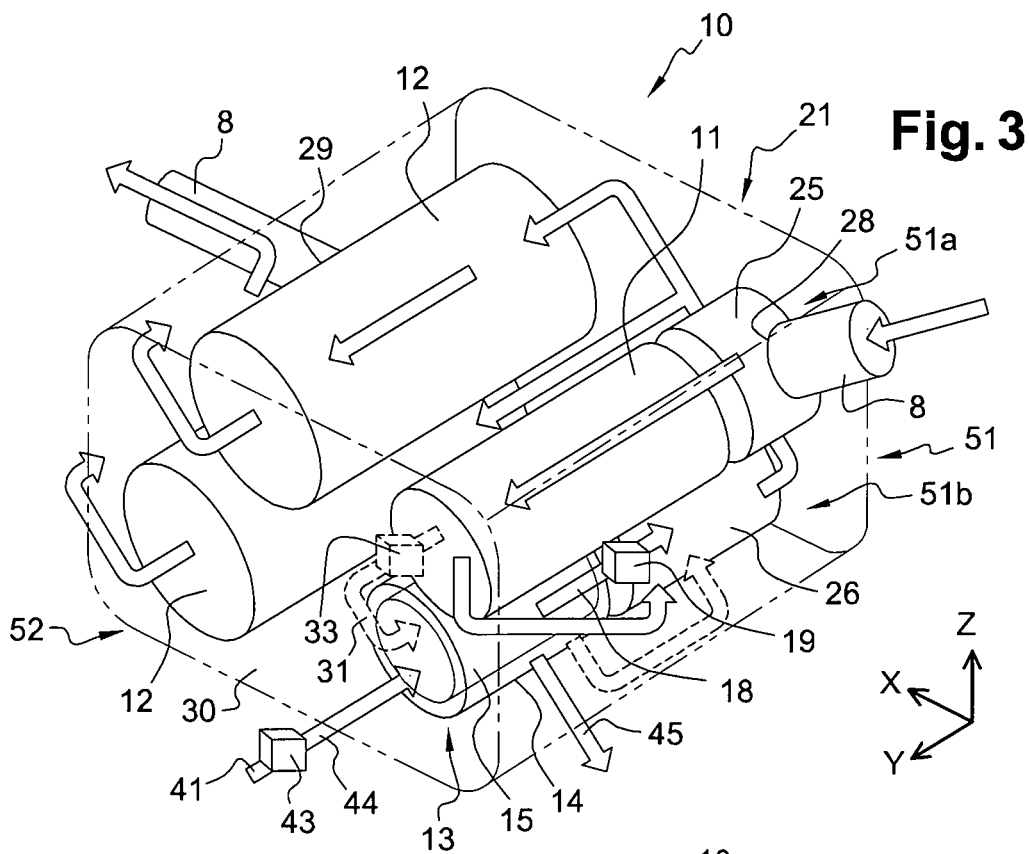
FIGS. 3 and 4 are schematic perspective views of a first and a second embodiments of the exhaust gas treatment system of FIG. 2.

Alternatively, as schematically illustrated in FIG. 3, the frame 21 can form a substantially closed housing delimited by side walls and comprising an inlet 28 for exhaust gases flowing from the engine 5, and an outlet 29 for purified exhaust gases released towards the atmosphere. With this embodiment, the devices arranged on the frame may be contained within the closed housing. The exhaust flow can be guided from one device to the following one, in the flow direction of exhaust gases, by pipes. Alternatively, at least part of the exhaust flow can be guided by the housing itself as well as, possibly, by internal walls of the housing. In an embodiment, the housing does not include any pipes as such at all, but rather internal partition walls which, in combination with the housing side walls, ensure the guidance of the exhaust flow from the inlet towards the outlet through the successive devices.

In this alternative embodiment, the frame 21 not only has a supporting function but also an exhaust flow guiding function.

The frame 21, as a closed housing, may furthermore comprise a removable cover 30 for accessing the tank 14, to allow the driver or another person to replace the tank 14, for example when there is substantially no more gaseous ammonia stored in the material 15.

In both cases, the frame 21 may define a volume corresponding to its external contour which may be either open, partially open or closed. The various components arranged on the frame, including the SCR device 12, the gaseous ammonia supplying device 13, the oxidizing catalyst device 25, the filter 11, the mixing chamber 26 and/or the additional oxidizing catalyst device 27 may be fully contained with said volume. Alternatively, at least one of said components may be only partially contained in said volume, or may be arranged on the frame but outside of the volume.

The various components including the SCR device 12, the gaseous ammonia supplying device 13, the oxidizing catalyst device 25, the filter 11, the mixing chamber 26 and/or the additional oxidizing catalyst device 27, may be arranged on the frame by being fastened to the frame, preferably rigidly fastened. Each component may be fastened on the frame by being screwed, clipped, clamped, braced, welded, glued, etc . . . on the frame.

Preferably, the various components arranged on the frame, including at least the SCR device 12, the gaseous ammonia supplying device 13, and also preferably including any of the oxidizing catalyst device 25, the filter 11, the mixing chamber 26 and/or the additional oxidizing catalyst device 27—if present—, are not fastened to the vehicle otherwise than through the frame 21.

The heating system 16 may derive heat from the heat of exhaust gases flowing from the engine 5. This is made much easier to put in practice thanks to the fact that the heating system is arranged on the frame on which are arranged other components through which exhaust gas flows. The proximity allows an easier design of such heating system.

Figure 4:
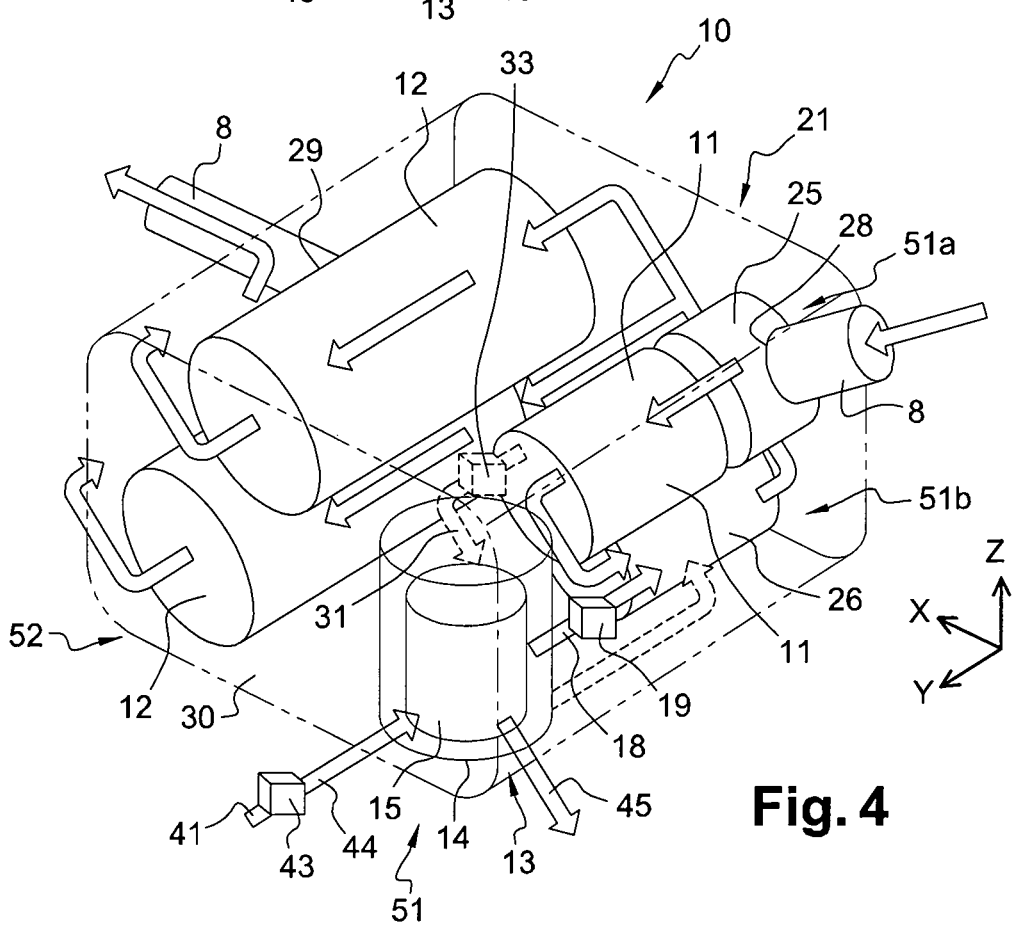

To that end, according to an embodiment, and as illustrated in FIG. 2, the exhaust gas treatment system 10 may comprise a heating line 31 which branches from the exhaust line 8 and returns to said exhaust line 8 and carries exhaust gases. The terms "exhaust line" here includes the portion of the exhaust flow path located inside the frame 21, in addition of the exhaust line 8 itself, outside the frame 21. Said path can be defined by pipes, as schematically illustrated in FIG. 2. Alternatively, said path can be defined by the frame 21 itself when it is a closed housing, as well as, possibly, by internal walls of the housing, as previously explained and as illustrated in FIGS. 3 and 4.

Figure 5:
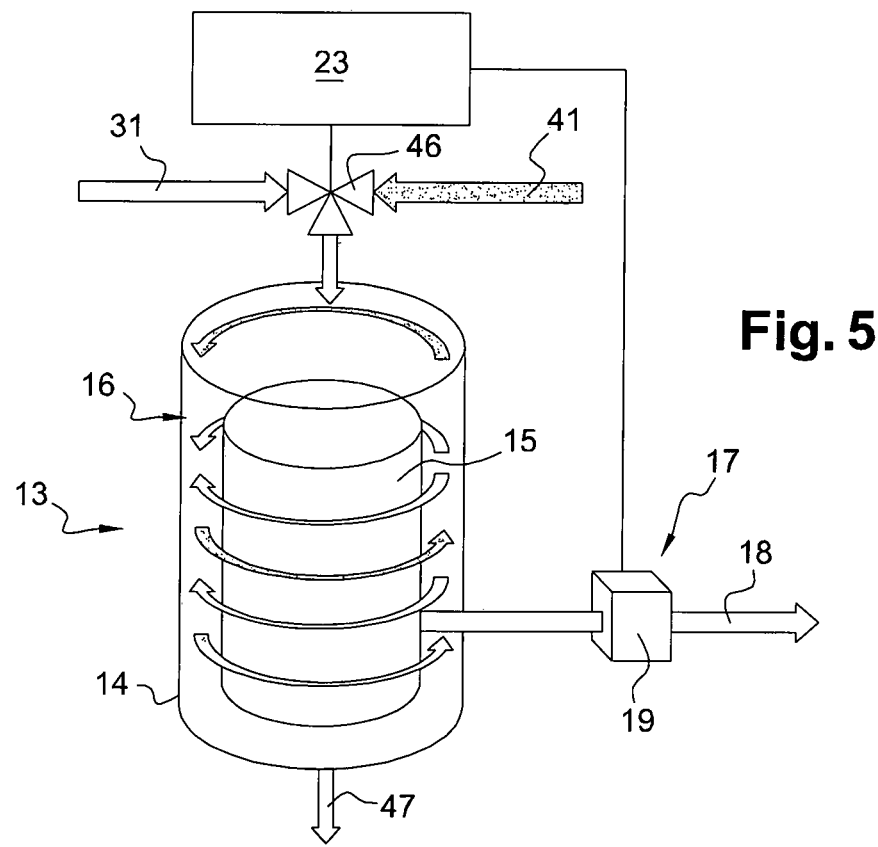
FIG. 5 is a schematic and partial representation of another embodiment of an exhaust gas treatment system, more particularly showing a gaseous fluid supplying device.

The heating line 31 has a portion 32 which is thermally connected to the tank 14 and forms a heat exchanger. In the example shown on FIG. 2, the heat exchanger portion 32 is schematically shown to be formed of a serpentine portion of a pipe which is coiled around the tank 14. However, other designs are possible for the heat exchanger portion 32. For example, the heat exchanger portion of the heating line could be formed as a conventional heat exchanger thermally connected to a side of the tank 14. In the Example of FIGS. 3 to 5, the heat exchanger portion of the heating line 31 is schematically shown as an annular cavity surrounding the tank 14, the exhaust gases circulating in said cavity. In still another design, the heat exchanger portion could be formed of a portion of the line arranged within the tank, amidst the material 15.

Besides, a valve 33 may be arranged in the heating line 31 and is controlled by a control unit, which may be the control unit 23. The valve 33 is capable of allowing an appropriate flow rate of exhaust gases to flow through the portion 32, depending on the operating conditions, so as to allow control of the tank temperature, resulting from the amount of heat transferred from the exhaust gases to said tank 14.

The valve 33 controlled by the control unit 23 therefore makes it possible to cause ammonia release (in case the tank temperature is above the threshold temperature) or to prevent ammonia release (in case the tank temperature is below the threshold temperature), while the ammonia dosing device 19 allows the ammonia flow rate to be regulated according to the current needs. Alternatively, it could be envisaged that the released ammonia flow rate be controlled by the valve 33 alone, the control of the exhaust gas flow rate in the heating line 31 by the valve 33 resulting in the control of the tank temperature and, ultimately, in a sufficiently precise control of the released ammonia flow rate.

According to an embodiment, the heating line 31 can also be contained in the frame 21, which results in an even better integration of the exhaust gas treatment, system 10, to an increased compactness and to an improved efficiency, in particular in terms of thermal exchanges.

In the embodiment shown in FIG. 2, the heating line inlet 34 and outlet 35 are both located between the filter 11 and the injector 20, in the flow direction of exhaust gases in the frame 21, said outlet 35 being located downstream from said inlet 34. However, other implementations are possible.

For example, it may be advantageous to arrange the outlet 35 downstream from the SCR device 12. With this implementation, there are fewer constraints related to the temperature of the exhaust gases when they return to the exhaust line 8.

The inlet 34 may also be arranged downstream from the SCR device 12. If needed, an electric heater may be provided to supply sufficient heat to the tank 14 during cold start of the engine 5 since, as said inlet 34 is fairly far from the engine 5, it may take time before the exhaust gases withdrawn from the exhaust line 8 through the inlet 34 reach a temperature high enough to enable ammonia release. This ensures regulations related to NOx emissions are met even during cold start.

In an embodiment, both the inlet 34 and outlet 35 can be located downstream from the SCR device 12, the exhaust gases flowing in the heating line 31 being then substantially treated. In such a case the outlet of the heating line 35 can in fact end directly into the atmosphere rather than into the exhaust line.

According to an embodiment, the heating system 16 can comprise a heat exchanger which is operated both by the heat of exhaust gases flowing from the engine 5 and by a cooling fluid. Furthermore, the exhaust gas treatment system 10 comprises a control unit—which may be the control unit 23—for the flow of exhaust gases and the flow of cooling fluid in the heat exchanger by means of at least one valve, thereby controlling the tank temperature. The controlled valve(s) may allow all of the flow(s) of exhaust gases and/or cooling fluid, part of said flow(s), or no flow at all, to enter the heat exchanger, in order to control the tank temperature.

By providing two sources of thermal fluid, and more precisely a fairly hot source and a fairly cold source, a better control of the temperature in the tank 14 can be achieved, whatever the operating conditions, i.e. whatever the exhaust gases temperature. Indeed, in case the exhaust gases temperature is too high, which would lead to an improper operation of the gaseous ammonia supplying device 13 or even to its deterioration, cooling fluid may be used to reduce the amount of heat transferred to the material 15.

This embodiment could be used even with a non integrated structure of the exhaust gas treatment system 10. In other words, said system 10 could comprise a frame—or housing—on which the tank 14 is not fastened, while the injector 20 can be contained in said frame. It may however be advantageous to arrange the tank 14 off the frame 21, but in the vicinity thereof. The frame would also include SCR device 12, and possibly the filter 11, the oxidizing catalyst device 25, mixing chamber 26, and/or additional oxidizing catalyst device 27 when present. Such a frame is illustrated by the rectangle 40 drawn in solid lines in FIG. 2. Said system 10 arranged on frame 40 is in fact a conventional muffler as found now on heavy duty trucks.

The cooling fluid may be fresh air. Fresh air supply can result from the vehicle forward movement. In case the vehicle speed is not high enough to provide the desired amount of fresh air, a system including a Venturi device could be used. Alternatively, fresh air may be supplied by a fan, or can come from a container in which air has been previously stored.

This embodiment using two sources of thermal fluid can have several variants.

According to a variant, as schematically illustrated in FIGS. 2-4, the flows of exhaust gases and fresh air do not mix. Therefore, there are provided a heating line 31 carrying exhaust gases and a separate cooling line 41 carrying the cooling fluid. The heating line 31 includes a first heat exchanger 32 using exhaust gases while the cooling line 41 includes a second heat exchanger 42 using cooling fluid. The control unit 23 controls the flow of exhaust gases in the first heat exchanger 31 by means of a first valve 33 and the flow of cooling fluid in the second heat exchanger 42 by means of a second valve 43, distinct from the first valve 33, thereby controlling the tank temperature. In case the exhaust gas treatment system 10 is of the integrated type, the second valve 43 may or not be arranged inside the frame 21. If the frame 21 assumes the form of a closed housing, it includes a cooling fluid inlet 44 and a cooling fluid outlet 45. As previously explained, the rate of gaseous ammonia release may be controlled either by the gaseous ammonia dosing device 19, provided the valves 33, 43 allow sufficient heat to be transferred to the material 15 so that ammonia release can occur. Alternatively, the rate of gaseous ammonia release could be controlled by the valves 33, 43 alone.

According to another variant, as schematically illustrated in FIG. 5, the heating system 16 can comprise a single heat exchanger in which the flows of exhaust gases and cooling fluid mix. The heating system 16 can then comprise a single three-way valve 46 controlled by the control unit 23 and capable of controlling the respective rates of exhaust gases and cooling fluid in the mixed flow which is in thermal contact with the material 15. A single outlet pipe 47 can therefore be provided at the outlet of the tank 14 for carrying the exhaust gas and cooling fluid mixture either back to the exhaust line 8 to be purified, or directly towards the atmosphere if the exhaust gases have been withdrawn from the exhaust line downstream from the treating devices.

Reference is now made to FIGS. 3 and 4 which show two possible embodiments of the internal spatial arrangement of the components inside the frame 21. Although the frame 21 is depicted as a substantially closed housing including a removable cover 30, in which the exhaust gases flow is guided without dedicated pipes, this shall not been considered as limitative. Indeed, the frame 21 could assume the form of a housing fully or partly open, comprising a structure of beams, as previously explained, with pipes provided to guide the exhaust gas flow between successive devices. The systems 10 shown on FIGS. 3 and 4 may have an external shape and spatial requirement, or bulkiness, similar to that of a conventional muffler as found on heavy duty trucks.

According to an embodiment, the frame 21 can comprise a first zone 51 including the oxidizing catalyst device 25—when present—, the filter 11—when present—, the gaseous ammonia supplying device 13 and the mixing chamber 26—when present—and a second zone 52 including the SCR device 12. Two SCR devices 12 may be arranged in the second zone 52, either in parallel or in series with respect to the exhaust gas flow.

The zones within the frame can be theoretical zones, without any specific physical boundaries between them. Alternatively, they can be physically separated, for example by a wall portion of the frame. If separated, the two zones can be designed to fluid tight one with respect to the other, with however one or several fluid pipes going from one zone to the other for carrying exhaust gases and/or ammonia from one zone to the other.

For example, as shown in FIGS. 3 and 4, the frame 21 can assume a substantially parallelepiped form defining three axes X, Y, Z. In an implementation, axis X corresponds to the longitudinal direction of the vehicle 1, axis Y corresponds to the transverse direction of the vehicle 1, and Z is the vertical direction. However, another spatial arrangement of the frame 21 on the vehicle 1 can be envisaged.

According to the embodiments of FIGS. 3 and 4, the zones 51, 52 can be situated on both sides of a plane which is orthogonal to direction X and which divides the frame 21 into two parts not necessarily having identical volumes. Moreover, the zones 51, 52 can extend substantially over the whole dimension of the frame 21 along direction Y.

The exhaust gases can enter the exhaust gas treatment system—typically by the inlet 28
  in the first zone 51 and exit the exhaust gas treatment system—typically by the outlet 29
  from the second zone 52.

The cooling fluid, when it is used to control the tank temperature, can enter the frame 21—typically by the inlet 44—in the first zone 51 and exit the frame 21—typically by the outlet 45—also from the first zone 51.

According to a first embodiment illustrated in FIG. 3, in the first zone 51, the tank 14 can be disposed substantially in parallel but not in alignment with the particulate filtering device 11. In other words, the tank 14 and the particulate filtering device 11 may be arranged substantially in parallel relationship and located substantially adjacent to each other along a direction which is orthogonal to a longitudinal axis of the particulate filtering device 11. For example, both the tank 14 and the filter 11 are arranged along Y while being adjacent along Z.

The first zone 51 may comprise a first area 51a and a second area 51b which extend substantially in parallel, with the oxidizing catalyst device 25 and the particulate filtering device 11 extending substantially coaxially in the first area 51a, while the mixing chamber 26 and the tank 14 are arranged in the second area 51 b.

The first and second areas 51 a, 51 b may be situated on both sides of a plane which is orthogonal to direction Z and which divides the first zone 51 into two parts not necessarily having identical volumes. For example, each area 51a, 51 b may extend substantially over the whole dimension, along Y, of the first zone 51. The mixing chamber 26 and the tank 14 can take up substantially the whole dimension, along Y, of the second area 51 b, and/or the oxidizing catalyst device 25 and the particulate filtering device 1 1 can take up substantially the whole dimension, along Y, of the first area 51a. Some space may however be allocated for the exhaust gas flow and possible pipes for guiding said flow.

According to a second embodiment illustrated in FIG. 4, in the first zone 51, the tank 14 extends substantially orthogonally to the particulate filtering device 11, close to one end of said particulate filtering device 1.

The first zone 51 may comprise a first area 51a and a second area 51b which extend substantially in parallel. The tank 14 may span the first and second areas 51a, 51b, at an end portion of said first and second areas 51a, 51b. Moreover, the oxidizing catalyst device 25 and the particulate filtering device 11 may extend substantially coaxially in the first area 51a, while the mixing chamber 26 is arranged in a part of the second area 51 b which is not occupied by the tank 14.

The first and second areas 51 a, 51 b may be situated on both sides of a plane which is orthogonal to direction Z and which divides the first zone 51 into two parts not necessarily having identical volumes.

For example, each area 51a, 51b may extend substantially over the whole dimension, along Y, of the first zone 51. The mixing chamber 26 can take up substantially the whole dimension, along Y, of the second area 51b which is not occupied by the tank 14, and/or the oxidizing catalyst device 25 and the particulate filtering device 11 can take up substantially the whole dimension, along Y, of the first area 51a which is not occupied by the tank 14. Some space may however be allocated for the exhaust gas flow and possible pipes for guiding said flow.

Either of these two exemplary embodiments result from an optimization of the internal arrangement of the devices inside the frame 21 the one relative to the others which contribute to the compactness and overall efficiency of the exhaust gas treatment system.

It is to be understood that the present invention is not limited to the embodiments described above and illustrated in the drawings; rather, the skilled person will recognize that many changes and modifications may be made within the scope of the appended claims.

The invention claimed is:

1. An exhaust gas treatment system for fitting on a chassis of an automotive vehicle, wherein the system comprises:
  a selective catalytic reduction device;

a mixing chamber located upstream of the selective catalytic reduction device;

a gaseous fluid supplying device, comprising:

a tank containing a material which is capable of retaining gaseous fluid by absorption and/or adsorption and/or formation of chemical complexes, and of releasing previously retained gaseous fluid, wherein the material is a replaceable cartridge;

a gaseous fluid delivery system capable of causing the release of gaseous fluid by the material; the gaseous fluid delivery system being a heating system deriving heat from the heat of exhaust gases flowing from the engine an injection system for injecting gaseous fluid upstream from the selective catalytic reduction device, wherein the mixing chamber is located downstream from the injection system; wherein the heating system comprises a heating line which branches from the exhaust line, said heating line carrying exhaust gases and having a portion which is thermally connected to the tank and forms a heat exchanger.

2. The system according to claim 1, wherein the exhaust gas treatment system further comprises a control unit for controlling a valve controlling the flow of exhaust gases in the heating line.

3. The system according to claim 1, the system further comprising a frame attachable to but comprising a distinct component from the chassis of the vehicle, wherein the selective catalytic reduction device and the gaseous fluid supplying device are arranged on the frame, wherein the heating line is also contained in the frame.

4. The system according to claim 3, wherein the frame forms a substantially closed housing comprising an inlet for exhaust gases flowing from the engine, and an outlet for treated exhaust gases released towards the atmosphere.

5. The system according to claim 4, wherein the housing comprises a removable cover for accessing the tank.

6. The system according to claim 3, wherein it further comprises a particulate filtering device, said particulate filtering device being also arranged on said frame.

7. The system according to claim 3, wherein it further comprises an oxidizing catalyst device, said oxidizing catalyst device being also arranged on said frame.

8. The system according to claim 3, said mixing chamber being also arranged on said frame.

9. The system according to claim 3, wherein it further comprises an additional oxidizing catalyst device located downstream from the selective catalytic reduction device, for controlling a possible fluid slip, said additional oxidizing catalyst device being also arranged on said frame.

10. The system according to claim 3, wherein the frame comprises a first zone including an oxidizing catalyst device when present, a particulate filtering device, the gaseous fluid supplying device and a mixing chamber and a second zone including the selective catalytic reduction device.

11. The system according to claim 10, wherein, in the first zone, the tank is disposed substantially in parallel but not in alignment with the particulate filtering device.

12. The system according to claim 10, wherein the first zone comprises a first area and a second area which extend substantially in parallel, and in that an oxidizing catalyst device and a particulate filtering device extend substantially coaxially in the first area, while a mixing chamber and the tank are arranged in the second area.

13. The system according to claim 10, wherein, in the first zone, the tank extends substantially orthogonally to the particulate filtering device, close to one end of said particulate filtering device.

14. The system according to claim 13, wherein the first zone comprises a first area and a second area which extend substantially in parallel, in that the tank spans the first and second areas, at an end portion of said first and second areas, and in that the oxidizing catalyst device and the particulate filtering device extend substantially coaxially in the first area, while the mixing chamber is arranged in a part of the second area which is not occupied by the tank.

15. The system according to claim 1, wherein the heating system comprises a heat exchanger which is operated both by the heat of exhaust gases flowing from the engine and by a cooling fluid, the exhaust gas treatment system further comprising a control unit for controlling the flow of exhaust gases and the flow of cooling fluid in the heat exchanger, thereby controlling the tank temperature.

16. The system according to claim 15, wherein the cooling fluid is fresh air.

17. The system according to claim 1, wherein the heating line returns to the exhaust line after the heat exchanger portion.

18. The system according to claim 1, wherein the injection system comprises an injection line which comes from the tank and which includes a gaseous fluid dosing device, and an injector for injecting gaseous fluid upstream from the selective catalytic reduction device.

19. The system according to claim 1, wherein the material contained in the tank comprises a saturated inorganic salt.

20. The system according to claim 1, wherein the gaseous fluid is ammonia.

21. An engine arrangement comprising a combustion engine and an exhaust line carrying exhaust gases flowing from the engine towards the atmosphere, wherein it further comprises an exhaust gas treatment system according to claim 1, which is arranged in the exhaust line.

* * * * *